Patented Nov. 7, 1944

2,362,182

UNITED STATES PATENT OFFICE

2,362,182

MANUFACTURE OF CELLULOSE ACETATE SOLUTIONS

William O. Baker, Morristown, N. J., assignor to Bell Telephone Laboratories, Incorporated, New York, N. Y., a corporation of New York No Drawing. Application December 20, 1941, Serial No. 423,806

9 Claims. (Cl. 106—183)

This invention relates to solutions of cellulose esters and to methods of producing them.

The common commercial cellulose acetates are substances having acetyl contents between about 37 per cent and about 39 per cent. They are prepared by acting upon cotton linters with a mixture of acetic anhydride and glacial acetic acid in the presence of a peptizing agent such as sulphuric acid or zinc chloride. Since cellulose acetate is soluble in acetic acid the cellulose appears to dissolve as the reaction proceeds and a thick liquid or paste results. If the cellulose acetate is precipitated at this point, it is obtained as the triacetate containing about 62 per cent combined acetic acid (44.7 per cent acetyl).

The cellulose triacetate product by precipating at this point is more stable to light, oxidation and hydrolysis than the partially acetylated cellulose commonly used in commercial practice. The cellulose triacetate is more desirable as electrical insulation than the lower cellulose acetates, since it has an excellent insulation resistance which is less affected by high humidities than the lower acetates. However, the technical utility of cellulose triacetate has been limited by its insolubility in commercial solvents other than chlorinated hydrocarbons, the toxicity and corrosiveness of which have made them often impractical. Likewise, because of the high melting point of cellulose triacetate and its lower solubility in plasticizing agents, the preparation of molding compositions of cellulose triacetate involves dispersing the plasticizer with a solvent which may subsequently be readily removed. The previously available chlorinated solvents are poorly suited for this purpose.

Therefore, cellulose acetate for commercial use is ordinarily not precipitated as cellulose triacetate from the solution resulting from the acetylation reaction described above. Instead, a ripening period is allowed between the completion of the acetylation and the precipitation of the acetate, usually after the addition of a small amount of water and a little acid as a catalyst for hydrolysis. During this ripening the cellulose triacetate is hydrolyzed back to cellulose acetates of lower acetyl content. The lower cellulose acetates (below about 40 per cent acetyl) are soluble in acetone and certain other common organic solvents. When the hydrolysis has progressed sufficiently to produce a cellulose acetate having the desired solubility in acetone, the product is precipitated with water and has an acetyl content in the vicinity of about 37 per cent to about 39 per cent.

According to the present invention means is provided whereby solutions in certain common organic solvents are formed from cellulose triacetate and other cellulose acetates having a degree of acetylation so high as to prevent them from entering directly into solution in acetone at room temperature or above. It has been found that these highly acetylated cellulose acetates are actually soluble in certain of the common organic solvents which are capable of dissolving the lower cellulose acetates, but do not enter into solution at room temperature or above because the requisite preliminary step of swelling in the solvent cannot take place at these temperatures. If, however, the cellulose acetate is cooled to a temperature below about 0° C. and maintained in contact with such a solvent for a sufficient period of time, swelling takes place. At these lower temperatures, as, for instance, at −75° C. the composition produced by swelling is not fluid but exhibits gel properties. As the swollen gel is warmed to room temperature it becomes a relatively fluid solution. The increase in fluidity with warming is facilitated by stirring.

By this means there have been produced, for the first time, solutions of cellulose triacetate in acetone and certain other solvents for the lower acetates. Of the common cellulose acetate solvents the following have been found to be suitable solvents for the purposes of the present invention:

Acetone
Methyl ethyl ketone
Methyl acetate
Ethyl acetate
Propyl acetate
Methyl formate
Ethyl formate
Propyl formate Of these the formates are less effective solvents than the ketones and acetates. The higher homologues of the substances mentioned, such as diethyl ketone, butyl acetate or ethyl propionate, do not appear to swell or dissolve cellulose triacetate under the conditions set forth.

Although a slow swelling of cellulose triacetate occurs in the solvents mentioned above at about 0° C., the swelling becomes progressively more rapid and complete with decreasing temperature. The lower practical temperature limit for the swelling operation is set only by the solidification of the solvent or by its becoming so viscous that diffusion into the acetate is sluggish. Ordinarily, swelling in the solvent will be conducted at temperatures sufficiently below 0° C. to cause the operation to take place at practical speeds. Practical temperatures for operation are about —10° C. as provided by salt-ice mixtures and about —75° C. as provided by solid carbon dioxide. For swelling to take place at reasonably rapid rates for commercial operation temperatures below about —50° C. will be found desirable.

The time required for sufficiently thorough swelling of the acetate to permit the formation of a solution upon warming is dependent upon the amount of acetate as compared to the solvent and upon the degree of physical subdivision of the acetate, as well as upon the temperature.

The solutions of cellulose triacetate produced as described above are relatively stable at concentrations of about 20 per cent and even higher. However, the stability decreases as the concentration of the triacetate in the solution is increased. An acetone solution containing 20 per cent by weight of cellulose triacetate, which is normally very viscous, remained clear for twenty-four hours at 25° C. but then developed a progressive turbidity accompanied by gradual stiffening. After six days the composition was an opaque stiff gel and there was no separation of liquid. This gel could no longer be dispersed in acetone at room temperature. However, when cooled to temperatures below 0° C. in the absence of a solvent and then reheated to 25° C. it regained its original fluidity and true solution characteristics. A 10 per cent solution of the triacetate in acetone developed only a slight turbidity with no change in fluidity after twenty-eight days at 25° C.

The solutions of the higher cellulose acetates produced as described above are useful for all the purposes for which solutions of the lower acetates are suited. As indicated above cellulose triacetate is more desirable for most purposes than the lower acetates, which absorb more moisture and are less stable to light, oxidation and hydrolysis. The solutions of the higher acetates may be used as lacquers for various coating purposes as well as for forming insulating coatings on bare wire, textile covered wire or other types of wire. These solutions may also be used for casting sheets or photographic films of cellulose triacetate. They may also be used for spinning textile filaments or fibres.

For many purposes, where flexibility of the cellulose acetate produced by evaporation of the solution is desired, plasticizers for the cellulose triacetate may be dissolved directly in the solution. Among the suitable plasticizers for this purpose may be mentioned butyl citrate, amyl citrate, benzyl crotonate, cyclohexanyl crotonate, dimethyl phthalate and diethyl phthalate. The resulting solution containing a plasticizer may be evaporated to form plasticized sheets, photographic films, textile fibres, coatings on wire or molding compounds or it may be put to any other use for which a cellulose acetate solution is suited.

Inasmuch as many plasticizers function through a solvent action, the cooling and reheating technique described above for the formation of fluid solutions may also be applied to the direct incorporation of a solvent plasticizer into cellulose acetate and other cellulose esters without the formation of a solution in which the cellulose ester is completely dispersed in a solvent. Plasticizers are ordinarily incorporated into the lower cellulose acetates by hot milling operations. Inferior molding powders, often attributed to poor dispersion of the plasticizer throughout the cellulose acetate and to inhomogeneities in the mixing, sometimes result. The uniformity of these products can be improved by mixing in the solvent plasticizer at a temperature substantially below room temperature, as low as about 0° C. or even below about 0° C., allowing limiting swelling to occur at these temperatures and then subjecting the mixture to a hot milling operation to perfect the distribution of the plasticizer. The lower temperature limit for the swelling operation is set only by the solidification of the solvent plasticizer. The action involved is the same as that involved in the production of solutions as described above except that so little of the plasticizer is present as compared to the cellulose ester that molecular dispersion of the ester in the solvent does not occur. This procedure will be found particularly advantageous with the lower cellulose acetates which are normally considered acetone soluble. It will also be found advantageous with other cellulose esters, such as cellulose butyrate and cellulose acetate-butyrate.

The following specific examples will serve to indicate the manner in which the present invention may be practiced.

*Example 1*

A mixture of acetone with 20 per cent by weight of cellulose triacetate flake was maintained at —75° C. for six hours. A thick, gelled, dispersion resulted, which became fluid on warming to 25° C. Films from this solution, cast on glass plates and spread with a doctor blade, air-dried first at room temperature and finally at 60° C., were clear and of fair tensile strength but were flexible only in very thin sections. By way of comparison, 10 grams of cellulose triacetate flake were maintained in 100 cc. of acetone at room temperature for one hundred days without any apparent swelling or solution of the acetate.

*Example 2*

An amount of the 20 per cent solution of cellulose triacetate in acetone produced in Example 1 corresponding to 1 gram of the acetate was mixed at room temperature with .3 cc. of dimethyl phthalate. Films cast from the solution were tough, clear and flexible.

*Example 3*

An amount of the solution produced in Example 1 equivalent to 1 gram of the triacetate was mixed with .2 cc. of diethyl phthalate. Films cast from the solution were clear and fairly flexible.

*Example 4*

A solution of cellulose triacetate in acetone was prepared as described in Example 1 except that 10 per cent by weight of the triacetate was used in place of 20 per cent. The resulting solution was mixed with .3 cc. of dimethyl phthalate. Films cast from the solution were clear and uniform, flexible and of good fold resistance.

*Example 5*

A 10 per cent by weight solution of cellulose triacetate in acetone was prepared as described in Example 4 with no added plasticizer. Films cast from this solution were clear but were flexible only when thinner than 1 mil.

*Example 6*

5 grams of cellulose triacetate flake were added to 25 cc. of ethyl acetate. The solvent did not swell, congeal or dissolve the flake on prolonged standing at room temperature. After four hours at −75° C. a swollen fluid gel had formed which was converted into a stable but slightly turbid solution on warming to 25° C. This solution was suitable as a coating dope, as a compounding medium for molding powder and for various other purposes for which cellulose acetate solutions are used. Films cast from it without plasticizer showed good flexibility and strength. A certain amount of this flexibility was lost on aging. The improved flexibility compared to other solvents may have resulted from reduction of the size of crystallites formed from ethyl acetate. The ethyl acetate solution is especially suitable for applications requiring the pure, stable unplasticized cellulose triacetate.

*Example 7*

0.4 gram of commercial cellulose acetate flake containing 38 per cent acetyl was intimately mixed with 0.1 gram of dimethyl phthalate. The mixture was placed in a refrigerated vessel maintained at about 0° C. for 8 hours. Although dimethyl phthalate possesses a normal freezing point slightly above 0° C., it supercools readily and it was therefore possible to maintain it in a liquid state during the swelling operation described. At the end of this period, the voluminous mass of flake was found to be well bound together by diffusion of the solvent plasticizer. The mixture was then heated and milled at 200° C. for 5 minutes. A clear, homogeneous plastic resulted.

The use of individual solvents for forming solutions of cellulose triacetate has been described above in Examples 1 to 6. Obviously, mixtures of any of the solvents described above as suitable for forming cellulose triacetate solutions may be employed.

Although the invention has been described in terms of its specific embodiments, certain modifications and equivalents will be apparent to those skilled in the art and are intended to be included within the scope of the invention which is to be limited only by the reasonable scope of the appended claims.

What is claimed is:

1. The method of dissolving cellulose triacetate in acetone which comprises swelling said cellulose triacetate in acetone at about −75° C. and raising the temperature of the swollen material until a relatively fluid solution is produced.

2. The method of dissolving cellulose triacetate in a cellulose acetate solvent selected from the group consisting of acetone, methyl ethyl ketone, methyl acetate, ethyl acetate, propyl acetate, methyl formate, ethyl formate and propyl formate which comprises swelling said cellulose triacetate in said solvent at about −75° C. and raising the temperature of the swollen material until a relatively fluid solution is produced.

3. The method of dissolving cellulose triacetate in a cellulose acetate solvent selected from the group consisting of acetone, methyl ethyl ketone, methyl acetate, ethyl acetate, propyl acetate, methyl formate, ethyl formate and propyl formate which comprises swelling said cellulose triacetate in said solvent at below about 0° C. and raising the temperature of the swollen material until a relatively fluid solution is produced.

4. The method of dissolving cellulose triacetate in a cellulose acetate solvent selected from the group consisting of acetone, methyl ethyl ketone, methyl acetate, ethyl acetate, propyl acetate, methyl formate, ethyl formate and propyl formate which comprises swelling said cellulose triacetate in said solvent at below about −10° C. and raising the temperature of the swollen material until a relatively fluid solution is produced.

5. The method of dissolving cellulose acetate having a sufficiently high degree of acetylation that it does not dissolve directly in acetone at room temperatures which comprises swelling said cellulose acetate at a temperature below about 0° C. in a cellulose acetate solvent selected from the group consisting of acetone, methyl ethyl ketone, methyl acetate, ethyl acetate, propyl acetate, methyl formate, ethyl formate and propyl formate, and warming the resulting swollen material to form a fluid solution.

6. The method of incorporating a plasticizer in cellulose triacetate which comprises swelling said acetate in a solvent selected from the group consisting of acetone, methyl ethyl ketone, methyl acetate, ethyl acetate, propyl acetate, methyl formate, ethyl formate and propyl formate at a temperature below about 0° C., warming the resulting swollen material to form a relatively fluid solution, dissolving a plasticizer for cellulose triacetate in said solution and allowing said solution to evaporate to form a plasticized body of cellulose triacetate.

7. The method of incorporating a plasticizer in a cellulose ester which comprises intimately mixing said ester with a solvent plasticizer, maintaining said mixture at a temperature substantially below room temperature for a sufficient time to permit effective diffusion of the solvent plasticizer into the ester and kneading the mixture at an elevated temperature to distribute the plasticizer uniformly throughout the ester.

8. The method described in claim 7 wherein the cellulose ester is cellulose acetate.

9. The method which comprises maintaining cellulose triacetate in contact wtih a solvent selected from the group consisting of acetone, methyl ethyl ketone, methyl acetate, ethyl acetate, propyl acetate, methyl formate, ethyl formate and propyl formate at a temperature below about 0° C. for a time sufficient to permit the solvent to be absorbed into and to swell the cellulose triacetate and subsequently warming the mixture while subjecting it to physical agitation so as to promote uniform interdispersion of the solvent and the cellulose triaceate.

WILLIAM O. BAKER.